Nov. 17, 1942.   M. KASSER   2,302,227

METHOD OF CRACKING AND SHELLING NUTS

Filed Sept. 30, 1938   2 Sheets-Sheet 1

INVENTOR.
MORRIS KASSER
BY George B. White
ATTORNEY.

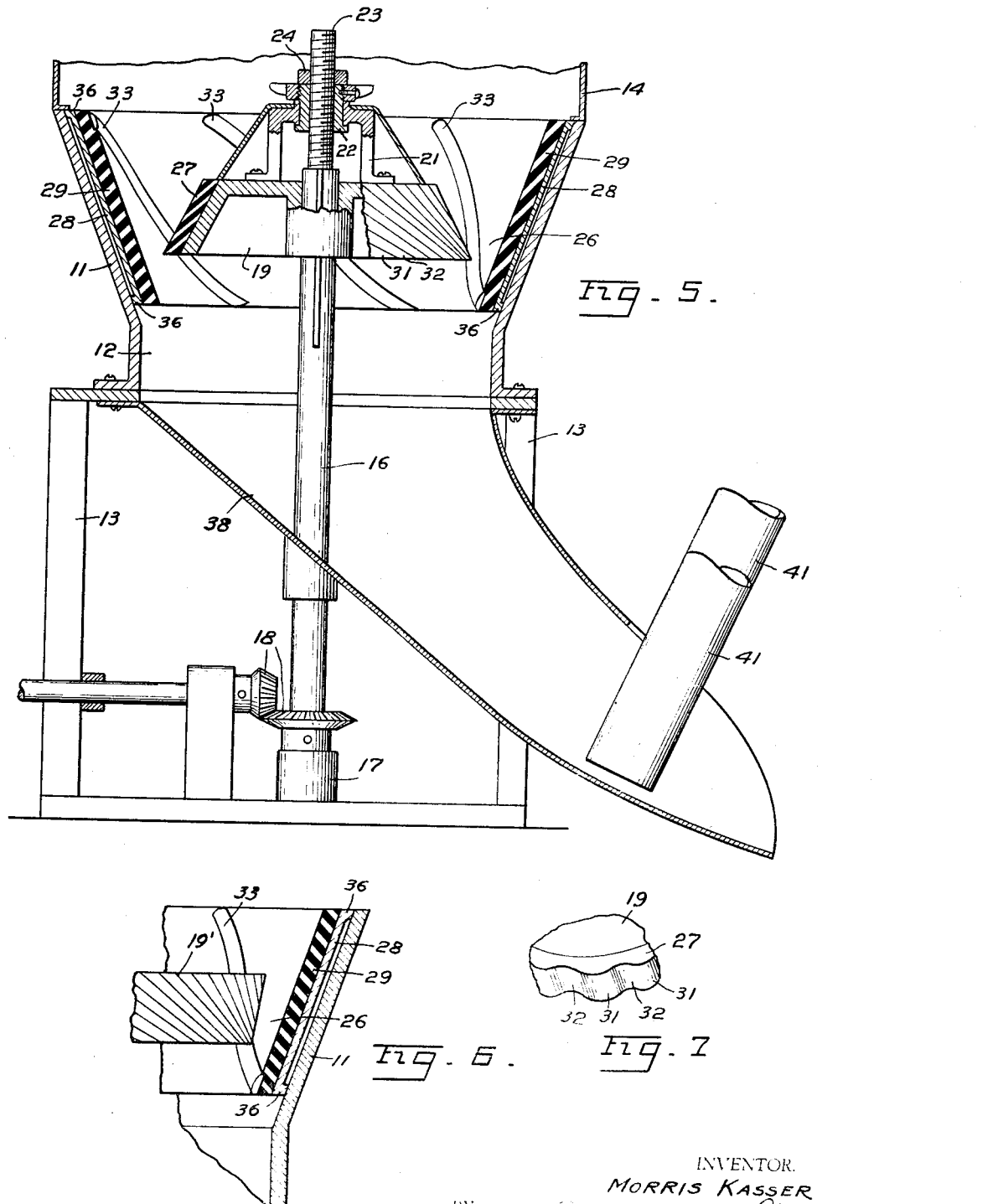

Patented Nov. 17, 1942

2,302,227

UNITED STATES PATENT OFFICE 2,302,227

METHOD OF CRACKING AND SHELLING NUTS

Morris Kasser, San Francisco, Calif.

Application September 30, 1938, Serial No. 232,506

3 Claims. (Cl. 146—219)

This invention relates to a method for cracking and shelling nuts.

The main disadvantages of methods and machines heretotfore utilized for cracking and shelling nuts were the slowness of production, the excessive breakage and crushing of the meat of the nuts into small fragments, and the excessive scuffing or scratching of the meat of the nuts.

An object of my invention is to provide a method for delivering an abundance of free meat from the nuts without scuffing or excessive crushing.

Another object of this invention is to provide a method for cracking and shelling nuts by applying a combination of forces so as to positively hold the nuts under the cracking pressure just long enough to crack and shell the nuts and then immediately to relieve the nuts from said forces before the meat is broken up or scuffed.

Another object of this invention is to provide a machine for cracking and shelling nuts which has means therein for positively and continuously advancing the nuts under cracking pressure and separating it from loose shells so as to provide a large proportion of unbroken meat in a comparatively short period.

Other objects of the invention together with the foregoing will be set forth in the following description of the preferred method, and the preferred embodiment of means for practicing the same, which is illustrated in the drawings accompanying and forming part of the specification. It is to be understood that I do not limit myself to the embodiment disclosed in said description and the drawings as I may adopt variations of my preferred forms within the scope of my invention.

An embodiment of my invention is clearly illustrated in the accompanying drawings wherein:

Fig. 5 is a sectional view of the cracking mechanism of my apparatus;

Fig. 6 is a fragmental sectional view of a modified arrangement of the cracking mechanism of my device; and Fig. 7 is a fragmental plan view of the rotating disc of the cracking mechanism.

Figure 1:
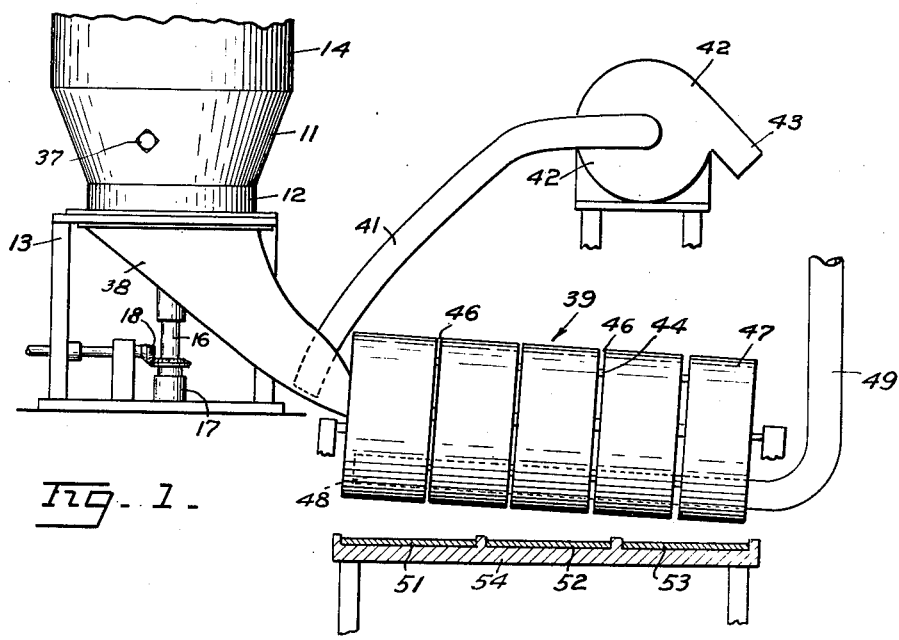
Fig. 1 is a somewhat diagrammatic side view of an apparatus incorporating my invention.
Figure 2:
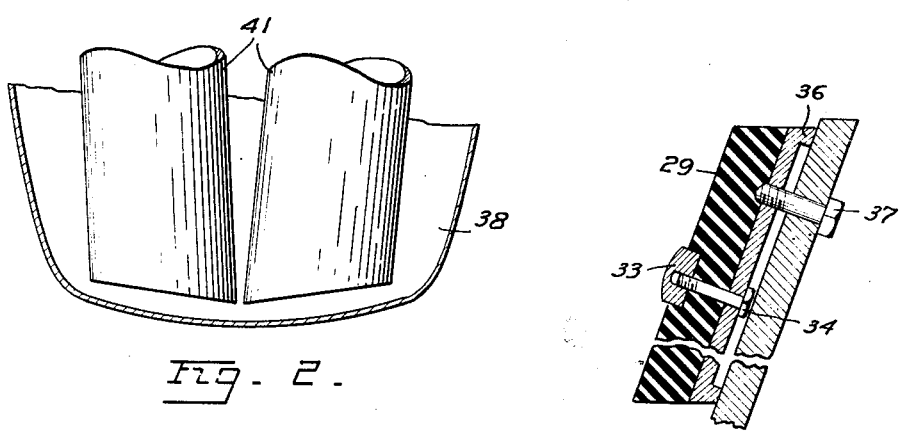
Fig. 2 is a fragmental sectional view of the outlet chute with the intake ends of suction conduits thereon.

My method includes the steps of applying to nuts a combination of forces to accelerate the advancement of the nuts through a cracking space, relieving the pressure immediately after cracking is completed, and removing loose shell pieces even before the sifting or complete separation or further treatment of the meat and shell.

The combination of forces applied to the nuts for cracking includes a rolling force, or rolling pressure, and a shearing force preferably directed at such angles as to advance and rotate the nuts in a cracking space. The nuts under these forces are rolled on a cracking surface and are simultaneously forced to advance on a path toward increasing pressure applied thereon for cracking and toward subsequent and quick release from said space. The aforesaid combination of forces is created by rolling the nuts under pressure on inclined preferably substantially spiral paths, and applying the rolling pressure at a different angle, preferably at a steeper angle, than that of said spiral path, so as to simultaneously roll the nuts, and advance them positively from one end of the cracking space to the other. The forces applied are suitably cushioned. The cracking space is preferably gradually diminishing toward its discharge end. The surfaces on which and by which said forces are applied to the nuts are "non-skid," namely, they are so formed as to prevent skidding of the nuts and to force the nuts to roll so as to be crushed on the portions of the shells between the ridges of the nuts.

The nuts are relieved from pressure immediately after they are forced into the narrowest portion of the cracking space. In other words the nuts are forced toward and out through the narrowest end of the cracking space by positively directed forces preferably on a spiral path. Consequently the nuts are forced out of the cracking space immediately after the maximum pressure is applied to them, and are positively prevented from rolling repeatedly around in the cracking space after cracking.

The product of cracking of my method and device contains a quantity of loose pieces of shells, which if fed together with the meat would cause further scuffing or scratching of the skin of the nuts. However in my method the products of cracking, before subjected to any other treatment of separation, are agitated by a stream of forced airflow, so as to remove loose shell pieces from said product. Thereafter the product can be sifted and run through a separator in the usual manner, but clogging of the separator as well as scuffing of the meat of the nuts is obviated.

In carrying out my invention I make use of a cracking mechanism which includes a frusto conical casing 11 the vertical, wide outlet 12 of which is exteriorly flanged and bolted on a frame 13. A suitable hopper 14 on the wider end or top of the casing 11 guides the nuts to be cracked and shelled into the casing 11. A shaft 16 is centrally and axially extended through the hollow casing 11 and is mounted on a base bearing 17. The shaft 16 is suitably rotated through gears 18. Near the upper end of the shaft 16 is slidably splined a rotor or disc 19 concentric with the casing 11. The disc 19 is adjustably held in place by a yoke 21 which is suspended on a traveling bushing 22, which latter is threadedly secured on a threaded end 23 of the shaft 16. The bushing 22 is rotatable in the yoke 21 but it may be locked in an adjusted position by means of a locknut 24. The disc 19 is frusto-conical on its outer periphery, and in the preferred embodiment in Fig. 5 herein the smallest end of the disc 19 faces the wider or inlet end of the casing 11.

In all instances there is provided a substantially annular cracking space 26 which diminishes downwardly toward the outlet of the casing 11. The cracking space 26 can be narrowed or widened by lowering or raising the disc 19 by adjusting the bushing 22 on the threaded end 23 of the shaft 16.

The adjacent surfaces of the disc 19 and the casing 11 have linings therein. It is preferable that these linings be made of some non-skid or frictional material such as rubber or composition so as to prevent skidding of the nuts on the lining surfaces. In this illustration the disc 19 has a composition or rubber lining 27 suitably secured, such as vulcanized, on its outer periphery. The casing 11 is provided with a removable lining in the form of a metal base 28 on which is mounted a cushioning layer 29 preferably made of rubber or the like.

To create positive guiding force to urge the nuts with a rolling motion downwardly and through the lower end of the cracking space 26, projections are provided both on the disc lining 27 and on the casing lining 28 or 29. The projections 31 on the disc lining 27 are inclined downwardly opposite to the direction of the usual rotation of the disc 19. The projections 31 alternate with correspondingly inclined depressions 32, the respective projections 31 and depressions 32 gradually tapering into each other preferably without sharp corners.

Figure 4:
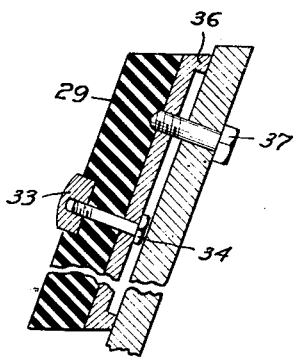
Fig. 4 is a fragmental, sectional view of the lining and wall of the casing of my cracking mechanism.
Figure 3:
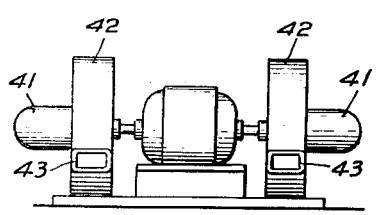
Fig. 3 is an end view of the blower arrangement on my apparatus.

The projections on the lining of the casing 11 are formed by embedded spiral strips 33 made of hard material such as metal, into the resiliently compressible layer 29 on the lining base 28. The strips 33 are pulled in place, in the manner shown in Fig. 4, by means of screws 34 so that about one half of the thickness of each strip 33 protrudes from the rubber layer 29. To allow for the heads of the screws 34 the metal lining 28 is spaced by flanges 36 from the inner periphery of the casing 11, and is held against rotation by setscrews 37 extended through the casing 11 into the lining 28.

It is to be noted that both the disc projections 31 and the spiral strips 33 incline toward the narrower end of the cracking space 26 and that the spiral strips 33 incline toward the direction of rotation of the disc 19. The incline of the disc projections 31 is at a smaller angle to the vertical than that of the spiral strips 33. In this manner a downward urging force is created which does not allow the nuts to work around loosely or jump upwardly but which positively forces the nuts substantially along the spiral paths defined by the strips 33 with a rolling motion. The rolling is facilitated and skidding is prevented by the non-skid, yieldable rubber surface between adjacent spiral strips 33. The downward push exerted by the projections 31 at such a steeper angle also causes a shearing force which accelerates not only the movement of the nuts through the cracking space 26 but also the loosening of the shells from the nuts. It is to be noted that the protruding half of each spiral strip 33 is rounded cross-sectionally so as to further facilitate the exertion of rolling cracking pressure on the nuts. When used in connection with walnuts, for instance, the cracking action is such that a large percentage of walnut meat is produced in halves, unscuffed and unscratched, and loosened from its shell. The acceleration of this cracking also prevents clogging even if the hopper 14 is full.

The cracking space 26 is narrowest at its lower end and the final cracking force is applied there. The cracked nut is forced through the space 26 at said lower end and is released immediately from all pressure. The height of the disc 19 is just sufficient to crack and shell the nuts so as to obviate the lengthy movement of cracked nuts in a cracking space. The vertical adjustability permits the adaptation of the cracking mechanism to nuts of various sizes. In the event the mechanism is used for cracking exceptionally hard shell nuts such as black walnut then both the projections 31 and the spiral strips 33 are made more rigid. Normally the nut is cushioned on the disc projections 31 and the spiral cracking strips 33 are cushioned on the yieldable layer 29 on the lining 28.

Through the wide outlet opening 12 the products of cracking are dropped onto a wide chute 38 which inclines steeply away from below said casing 11 so as to allow free gravity feed of the products of cracking to a sifter and separator 39. The product thus advancing by gravity is agitated and loose shell pieces are removed therefrom by forced airflow into suction conduits 41, which latter are provided with a suitable blower 42 at the top discharging the removed loose shells at 43 into suitable containers not shown. This agitation further accelerates movement of the product from the cracking mechanism, prevents clogging in the chute 38, and reduces possibility of clogging the separator 39.

The separator 39 may be of any of the usual type. In this embodiment the separator 39 is shown diagrammatically. The separator 39 is a rotatable unit made in several sections held together by bars 44 or the like. The annular spacings 46 between the adjacent ends of adjacent sections increase gradually in size from the intake end toward the lower end 47 of the separator 39. Thus the products are sifted or separated, according to the width of the slots or spaces 46 between said sections of the separator 39. The separator 39 is rotatably supported and rotated in any suitable manner not shown. To further agitate and accelerate separation a suction head 48 is located near the lower portion of the separator 39 which through a suction conduit 49 and by a suitable blower removes empty shells loosened in said separator 39.

The separator products may be received directly in suitable containers or on separate tables. In this illustration I show conveyor belts 51, 52, and 53 on a table 54, whereby the separated products dropped from the slots or spaces 46 of the separator 39 can be carried away, and if necessary again subjected to airblast, or suction, or further treatment. The number of conveyors or separated tables may be varied according to requirement for finer separation.

In the modified form shown in Fig. 6 the rotary disc 19' is inverted so that it tapers downwardly toward the outlet of the casing 11. In other respects the device operates in the same manner as in the preferred form heretofore described. This modified form is particularly for use in connection with small nuts.

It is to be also noted that the separator 39 is provided with the usual type of internal means such as spiral rails for carrying or directing the cracked product around the inner periphery of the rotating separator 39. Also scraper or other clearing means may be provided to remove pieces of nuts or shells that may stick in the slots or openings of the separator.

Having thus described my invention what I now claim and desire to secure by Letters Patent is:

1. The process of cracking and shelling nuts which consists in rolling the nuts between opposite compressible surfaces so that the nuts are partly embedded in said surfaces, and forcing the rolled nuts at intervals on said surfaces over rigid cracking surfaces.

2. A method of cracking and shelling nuts which consists in rolling the nuts through a space smaller than the diameter of the nuts and pressing the rolled nuts alternately against compressible and hard surfaces in said space so as to roll, crack and loosen the shells of the nuts.

3. A method of cracking and shelling nuts which consists in rolling the nuts with gradually increasing pressure through a space smaller than the diameter of the nuts, and upon a compressible surface at one side of said space, and alternately upon rigid and compressible surfaces at the opposite side of said space.

MORRIS KASSER.